United States Patent [19]
Ward

[11] 3,955,428
[45] May 11, 1976

[54] MECHANICAL AUTOMATIC TORQUE CONVERTER

[76] Inventor: Carter J. Ward, 244 Cedar St., Ventura, Calif. 93003

[22] Filed: Nov. 1, 1974

[21] Appl. No.: 520,070

[52] U.S. Cl. .................................. 74/64; 74/84 R; 192/41 S
[51] Int. Cl.² ................................. F16H 33/02
[58] Field of Search ............... 74/64, 84, 58, 112, 74/437; 60/113, 116

[56] References Cited
UNITED STATES PATENTS

| | | | |
|---|---|---|---|
| 685,704 | 10/1901 | Wilkinson | 60/412 |
| 2,239,893 | 4/1941 | Jackman, Jr. | 60/416 |
| 2,552,572 | 5/1957 | Mikina | 74/437 |
| 2,886,976 | 5/1959 | Dean | 74/64 |
| 2,957,363 | 10/1960 | Ingham | 74/437 |
| R26,513 | 12/1968 | Klaus et al. | 60/416 |

Primary Examiner—Benjamin W. Wyche
Assistant Examiner—Wesley S. Ratliff, Jr.
Attorney, Agent, or Firm—Richard S. Sciascia; J. M. St.Amand; David O'Reilly

[57] ABSTRACT

A torque converter that uses the reaction of energy storing devices to mechanically convert a given input angular velocity into an output torque. The torque converter is comprised of an input shaft which delivers an oscillatory motion to an inertia device, such as a flywheel, through connecting rods and lever arms. The inertia device transfers the oscillatory motion to the output shaft through differential gears and overrunning clutches. In the preferred embodiment, two inertia devices mounted on parallel axes with each 90° out of phase provide a smooth, continuous output torque.

24 Claims, 9 Drawing Figures

MECHANICAL AUTOMATIC TORQUE CONVERTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to torque converters, and more particularly relates to automatic transmissions which may be defined as a device used to transmit power or energy while changing the level of torque.

At present, fluid torque converters dominate the field because of their smoothness, long endurance, and high power transmission capability, but by no means are fluid converters ideal. For example, in the hydrodynamic torque converter, most commonly found in the automobile, the angle of the stator blades does not vary according to the slip ratio. Thus, for any slip ratio greater or less than that which produces tangential flow for the fixed stator blade angle, a loss occurs through hydraulic shock. Due to the rapid fall of efficiency for an increased stator blade angle, planetary automatic shift is required. This complicates the mechanism and decreases the reliability.

The most common mechanical transmission in use today is the sliding gear (standard) transmission which is a very efficient component, but it is incapable of automatically changing the speed ratio without manually changing the gears. Most power sources can operate only over a small speed range with good economy and power. As a result, a large number of gear changes are required for efficient operation (e.g., some large trucks have up to 16 forward gears).

Mechanical torque converters conceived in the 1920's, though potentially more efficient than present automatic transmissions, were not competitive because of their jerkiness and low endurance. Many of the endurance problems encountered were due to the necessary overrunning clutches. Most of the major improvements made on the overrunning clutch came after the general rejection of the earlier mechanical torque converters. This is therefore not a problem in the present mechanism. Also, the problem of jerkiness is greatly reduced in the present mechanism by the use of two or more inertia devices in the proper phase relationship. Thus, the mechanical torque converter of the present invention retains the advantages inherent in an automatic transmission while avoiding limitations of early designs.

SUMMARY OF THE INVENTION

The purpose of the present is to provide a mechanical torque converter which has the advantages of automatic transmissions without the need for planetary automatic shifting while eliminating the inherent relative jerk which was a primary disadvantage of the early mechanical transmissions. The mechanical torque converter of the present invention uses an inertia device to absorb energy input, converts it into kinetic energy, and then reconverts it to mechanical energy at the output, much as in the fluid hydrodynamic torque converter.

All the proposed embodiments of this system use the same three basic components (i.e., an oscillator, energy storage and transfer device, and a rectifier). In the preferred embodiment, the oscillator used is composed of a crank-rocker on non-circular gears which convert angular motion into an alternating angular displacement or velocity, respectively. The second component, the energy storing/transmitting mechanism, is a pair of inertia flywheels 90° out of phase with each other. Rectification is provided by overrunning clutches to produce a useful (unidirectional) motion at the output. An input angular velocity is applied to a shaft from some type of prime mover which oscillates the crank-rocker. The oscillatory motion of the crank-rocker is transmitted through gears to the energy storing inertia wheels. Inertia reaction to the angular accelerations of the oscillating inertia wheels is transmitted through gears to shafts connected to the overrunning clutches. The oscillating torque "picked up" by the overrunning clutches is transmitted to output gear trains. Two one-way clutches are used to rectify the oscillating torque generated by each oscillating inertia wheel. A smooth output torque results from the sum of the two rectified torques that are 90° out of phase.

OBJECTS OF THE INVENTION

It is one object of the present invention to provide a mechanical torque converter which provides a smooth output.

Another object of the present invention is to provide a mechanical torque converter which provides an output torque without the need for planetary automatic shifting.

Yet another object of the present invention is to provide a mechanical torque converter which provides a continuous and uniform output torque from an oscillating input.

Still another object of the present invention is to provide a mechanical torque converter which efficiently converts input energy into kinetic energy, and then reconverts it to mechanical energy at the output.

Yet another object of the present invention is to provide a mechanical torque converter which uses an inertia device to convert input energy into kinetic energy, and then reconverts it to mechanical energy at the output.

Still another object of the present invention is to provide a mechanical torque converter which produces a smooth output torque from two or more inertia masses arranged in proper phase relationship.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
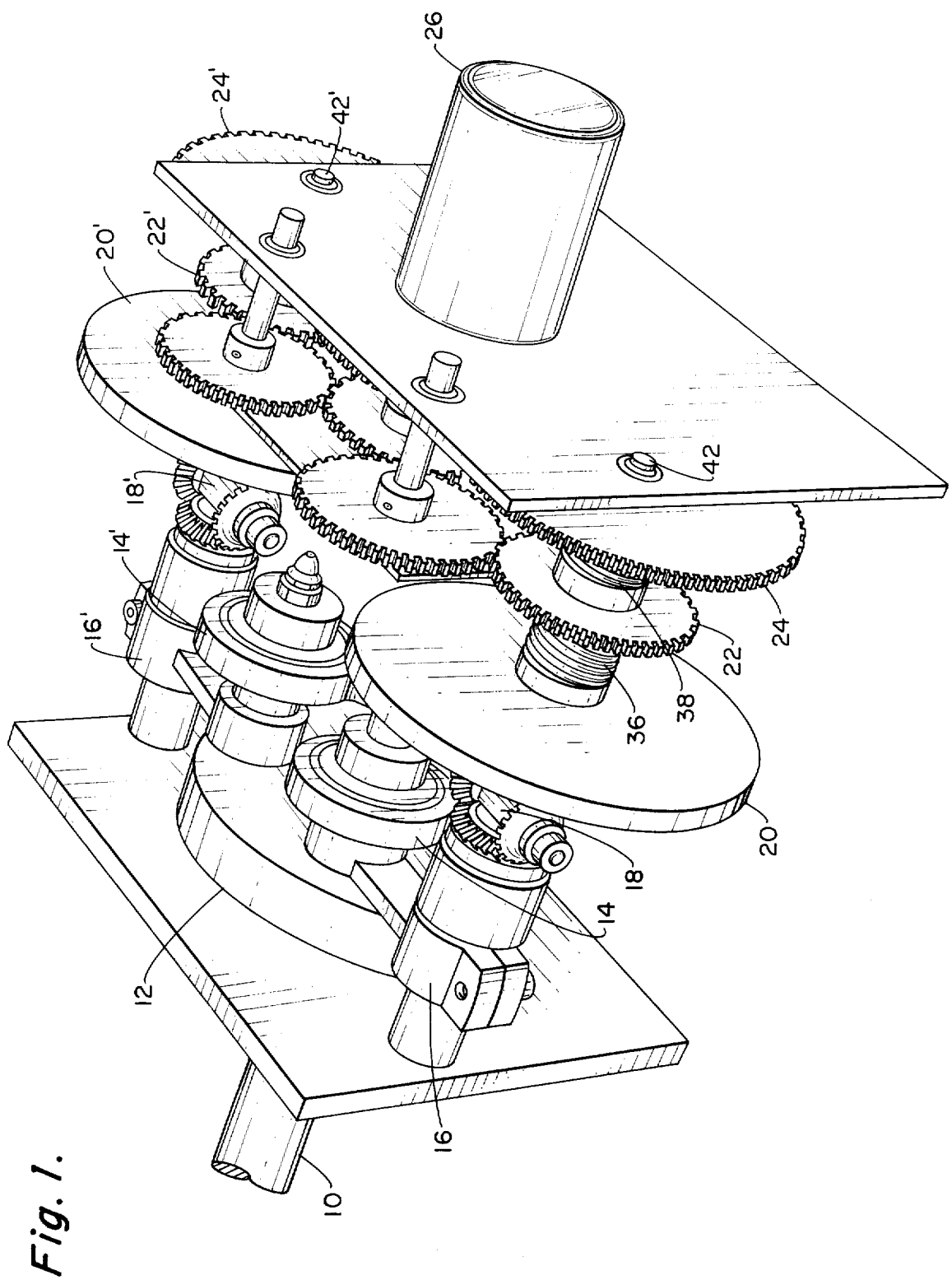
FIG. 1 is a perspective view of the preferred embodiment of the mechanical torque converter.

In the embodiment shown in the perspective view of FIG. 1, power is applied to an input shaft 10 to drive input flywheel 12. Input flywheel 12 is not discussed in detail because most prime movers contain a rotating inertia, thus eliminating the need for one in the mechanical torque converter. Since there are two identical axes, all the component parts having reference numerals with a prime, such as 14', 16', etc. indicate identical parts with the principle axes.

Input shaft 10 also drives connecting rod 14 which generates an oscillating motion at lever arm 16. The lever arm 16 imparts an oscillatory motion to inertia wheel 20 through differential system 18. Differential gear system 18 transmits the oscillating torque to output gears 22, 24 through overrunning clutches to output shaft 26. Proper phase relationship between inertia wheels 20, 20' provides a smooth, continuous rotation of output shaft 26 which will be more clearly described hereinafter.

Figure 2:
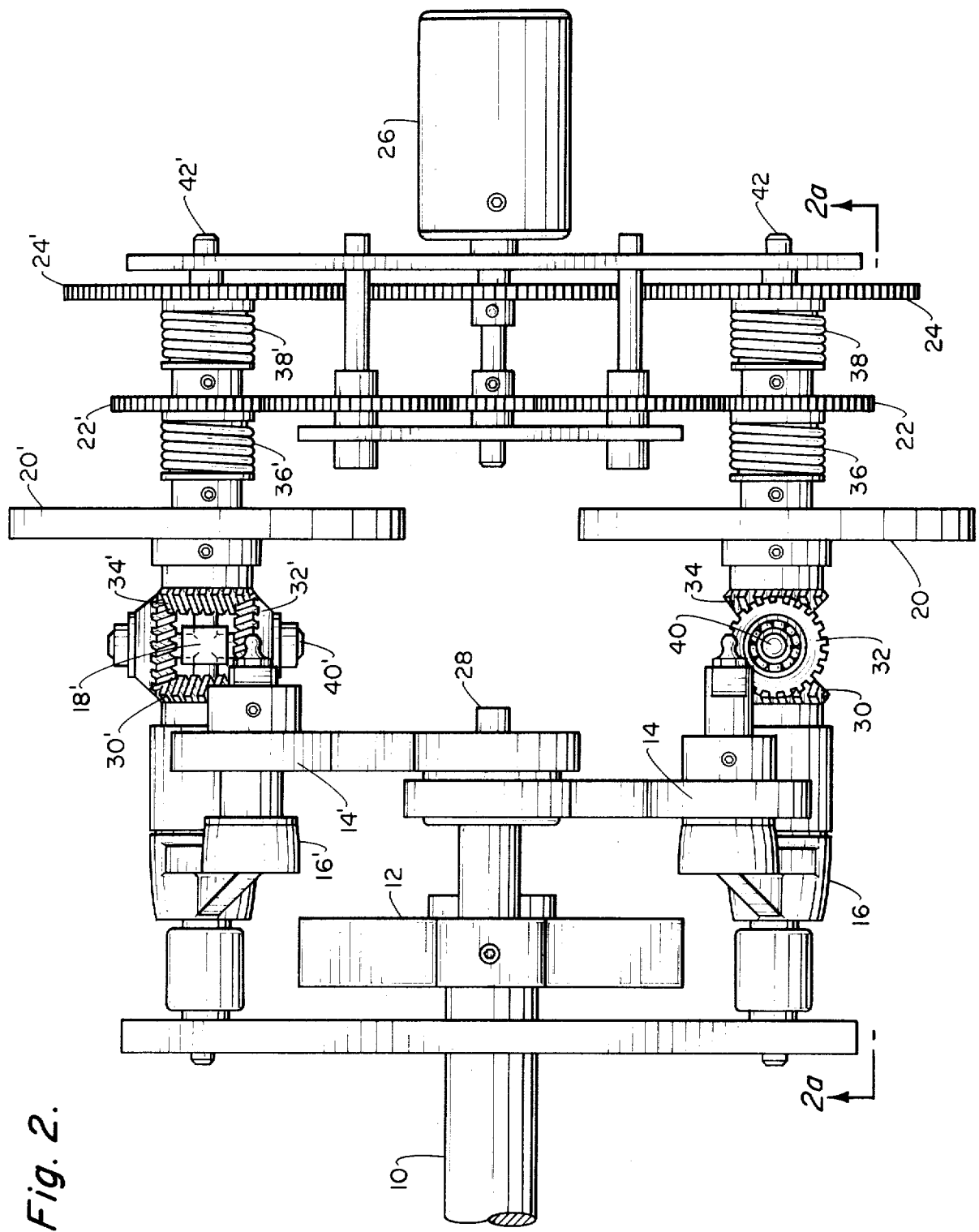
FIG. 2 is a top view of the mechanical torque converter as shown in FIG. 1.

The top view of FIG. 2 shows more clearly the manner in which connecting rods 14, 14' are connected to input shaft 10 by crank shaft bearing 28 attached to input flywheel 12. Each differential gear system 18, 18' is comprised of an input differential gear 30, planetary gears 32, and output differential gear 34. The oscillating torque transmitted by differential gear system 18 is rectified by overrunning clutches 36 and 38 operating output gears 22 and 24 which drive output shaft 26.

Figure 2A:
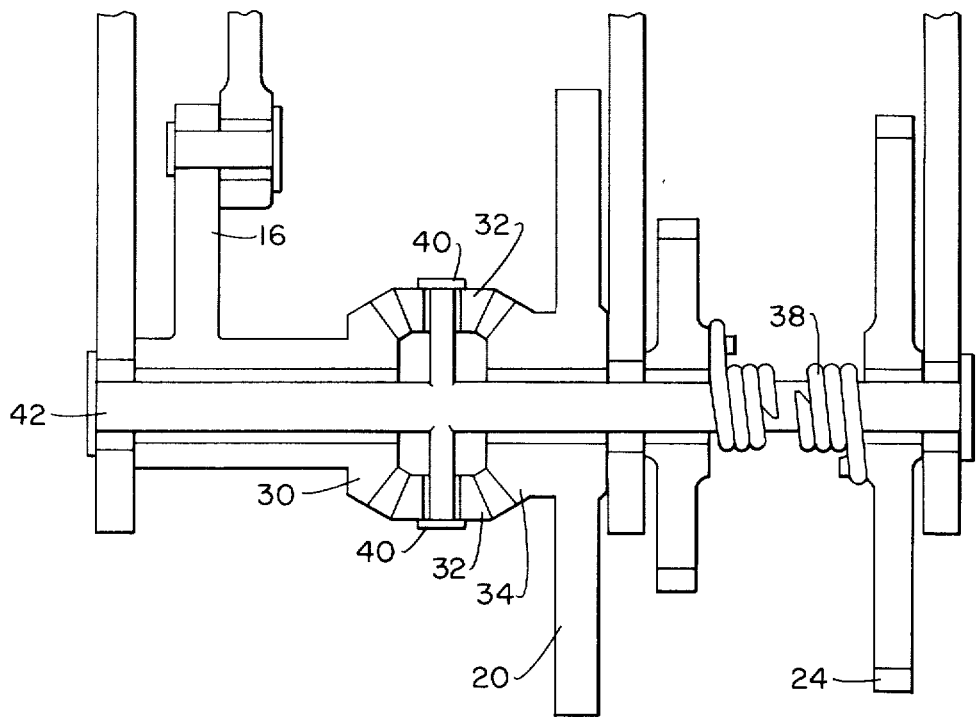
FIG. 2a is a pictorial cross-section taken at a—a of FIG. 2.

Since both sides (i.e., axes) of the mechanical torque converter are identical in construction and operate in the same manner, for clarity, only one inertia power flow will be discussed and their combined function described later. The mechanism shown in FIG. 2 uses the reaction of oscillating inertia wheels 20, 20' to mechanically convert a given input angular velocity ($\omega$) into an output angular velocity ($\Omega$) and/or output torque (T). Its output is automatically continuous for a torque from O to Tmax and an output angular velocity ($\Omega$) from 0 to k$\omega$ (i.e., an input angular velocity times a constant k where k is a constant determined by the gear ratios of the specific design). Internal energy losses are very small, so that when the output angular velocity is O and the torque is maximum (output stalled), the value of input torque $\omega$ approaches O. The output torque is proportional to the input angular velocity squared and the inertia of the inertia wheels. For purposes of analysis, FIG. 2a shows an approximate pictorial cross-section through axis a—a of FIG. 2. Planetary gears 32 are mounted on shafts 40 which are integral with shaft 42. Assume first that shaft 40 is fixed (i.e., no planetary motion is permitted). In this event, the oscillatory motion of the input differential gear 30 is transmitted through the planetary gears 32 to the output differential gear 34. The differential gear 34 is connected directly to the inertia wheel 20. Inertia reaction to the angular accelerations of the oscillating inertia wheels is transmitted as torque to shafts 40. Shaft 42 is integral with shafts 40 but merely passes through and supports the lever arm 16, input gear 30, output gear 34, and inertia wheel 20.

The oscillating torque in shaft 42 is picked up by overrunning clutch 38 and transmitted to the output through gear 24. Two one-way clutches 36, 38 (FIG. 2) are used on each side to rectify the oscillating torque generated by the oscillating inertia wheels 20. This rectification of oscillating torque is described as follows:

When shaft 42 experiences clockwise rotation, clutch 36 engages shaft 42, thereby imparting clockwise rotation to gear 22 from shaft 42. During clockwise rotation of shaft 42, clutch 38 is not engaged thereto, i.e., overrunning.

When shaft 42 experiences counter-clockwise rotation, clutch 38 engages shaft 42, thereby imparting counter-clockwise rotation to gear 24 from shaft 42. During counter-clockwise rotation of shaft 42, clutch 36 is not engaged thereto, i.e., overrunning.

It is noted that output shaft 26 experiences clockwise rotation for both clockwise and counter-clockwise rotation of shaft 42. If shaft 42 rotates clockwise, gear 22 rotates clockwise, thereby rotating gear 106 counter-clockwise. In turn, gear 106 rotates gear 104 clockwise, thereby imparting clockwise rotation to output shaft 26. If shaft 42 rotates counter-clockwise, gear 24 rotates counter-clockwise, thereby rotating gear 100 clockwise. In turn, gear 100 imparts clockwise rotation to output shaft 26.

When gear 104 is rotatably driven clockwise by shaft 42 via gear 22, gear 106 and clutch 36, gear 100 also rotates clockwise since both gear 100 and 104 are rigidly affixed to output shaft 26. This causes gear 100 to impart counterclockwise rotation to gear 24. However, slip clutch 38 prevents gear 24 from engaging shaft 42. Thus, gear 24 is overrunning with respect to shaft 42 as if it were connected to shaft 42 through bearings.

Figure 6A:
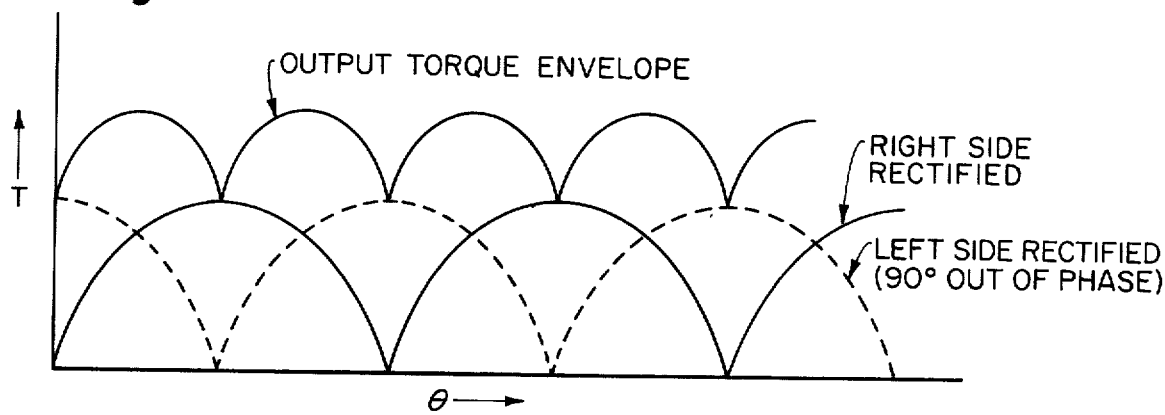
FIG. 6a is a graph of the rectified torques.

In like manner, when shaft 42 is rotating counter-clockwise, gear 22 overrides shaft 42 due to slip clutch 36. In short, gear 22 and 24 continually rotate in opposite direction only one being engaged to shaft 42 at any one instant, depending on the rotational direction of shaft 42. It is noted that shaft 42', gear 22', gear 24', slip clutch 36' and slip clutch 38' operate identically to their respective unprimed counterparts. The two sides of the mechanical torque converter are so arranged that the resulting output torque is a slightly "rippled" sum of two fullwave rectified torques that are 90° out of phase, as shown in FIG. 6a. Any inefficiencies that do exist in the mechanism tend to smooth the rippled output further so that, for most purposes, the output at shaft 26 can be assumed to be continuous and uniform.

In the stalled mode, the input torque ($\tau$) is nearly zero except for internal frictional losses. The reaction torque from the inertia wheel 20 is transmitted back through planetary gear 32 and input gear 30, lever arm 16 and connecting rod 14. However, the reaction torques from each side of the torque converter are arranged to cancel at the crank shaft bearing 28. In summary, the stalled output mode has characteristics of input angular velocity finite, input torque approaching zero, output angular velocity zero, and output torque maximum.

Operation in the mode with zero load (output torque $T = 0$) and output angular velocity maximum is also easy to visualize. In this case, the torque required to accelerate the inertia wheel 20 is much greater than the load. It can be analyzed as if the inertia of the wheel 20 is so great that the wheel does not move, i.e., inertia wheel 20 and output gear 34 are fixed. Therefore, oscillatory motion is merely passed through the planetary gears 32 to shafts 40 and then through the corresponding clutches 36 and 38 to the output shaft 26. Notice that with the output rotating under no-load, the output angular velocity reaches maximum and the output thereafter "free-wheels". That is, the output is rotating faster than the shaft 42 except for those instances where the shaft 42 reach their maximum (absolute) velocities.

In operation, the mechanism can automatically and continuously change the stalled limiting condition of $$\text{input} \left\{ \begin{array}{ll} \omega \text{ finite} & \Omega = 0 \\ \tau \to 0 & T \text{ maximum} \end{array} \right\} \text{output} \qquad (1)$$

to the no-load limiting condition of $$\text{input} \left\{ \begin{array}{ll} \omega \text{ finite} & \Omega \to k\omega \\ \tau \to 0 & T = 0 \end{array} \right\} \text{output} \qquad (2)$$

where $k$ is a constant determined by the gear and lever ratios of a specific design. In both cases, power-in and power-out are near zero. Intermediate cases involve transmission of power.

It is noted that the input power on shaft 10 via connecting rod 14 imparts oscillatory motion to lever arm 16. Thus, lever arm 16 produces an oscillatory power. This oscillatory power is absorbed by division in variable amounts between storage in the form of energy by inertia wheel 20 and dissipation by output shaft 26. That is, lever arm 16 drives either or both inertia wheel 20 and output shaft 26. When output shaft 26 is stalled or heavily loaded, inertia wheel 20 oscillates, i.e., differential 18 imparts sufficient torque to inertia wheel 20 to impart oscillation thereto. However, when the torque exerted on inertia wheel 20 by differential 18 is insufficient to overcome the inertia of inertia wheel 20, then all the power generated by the oscillatory motion of lever arm 16 drives output shaft 26.

A more detailed analysis of the mechanism of FIG. 1 for intermediate cases and further evaluations of the limiting conditions is as follows:

a. OUTPUT STALLED. The more rigorous analysis begins with the situation where the output is stalled. Angular velocities will be designated $\omega_i$ where i represents the numbered components of FIGS. 1 and 2. In the same way, $\theta_i$, $\alpha_i$, $T_i$, $I_i$, and $N_i$ will designate angular displacements, angular accelerations, torques, moments of inertia, and numbers of gear teeth, respectively. Note that input is now subscript 10 and output is now subscript 26.

If the input angular velocity ($\omega_{10}$) is assumed to be constant, the kinematics of 16 and 30 are determined by the geometry of the 4-bar linkage of 28, 14, and 16. This analysis will make use of a simplifying assumption that the 4-bar linkage yields a sinusoidal motion for 30 of $$\theta_{30}' = \theta_{30}' \sin \theta_{10} \qquad (3)$$

$$\omega_{30} = \theta_{30}' \omega_{10} \cos \theta_{10} \qquad (4)$$

$$\alpha_{30} = -\theta_{30}' \omega_{10}^2 \sin \theta_{10} \qquad (5)$$

where $\theta_{30}'$ is the magnitude of the oscillation of gear (30).

If the output 26 is restrained ($\omega_{26} = 0$) then the main shaft 42 and the planetary gear shaft 40 are also restrained because of the one-way clutches 36 and 38.

The operation of one-way clutches 36 and 38 are described, supra. When output 26 is constrained to have zero angular velocity, i.e., stalled, then inertia wheel 20 experiences oscillating motion about shaft 42. This is so because one-way clutches 36 and 38 prevent shaft 42 from rotating.

Figure 3:
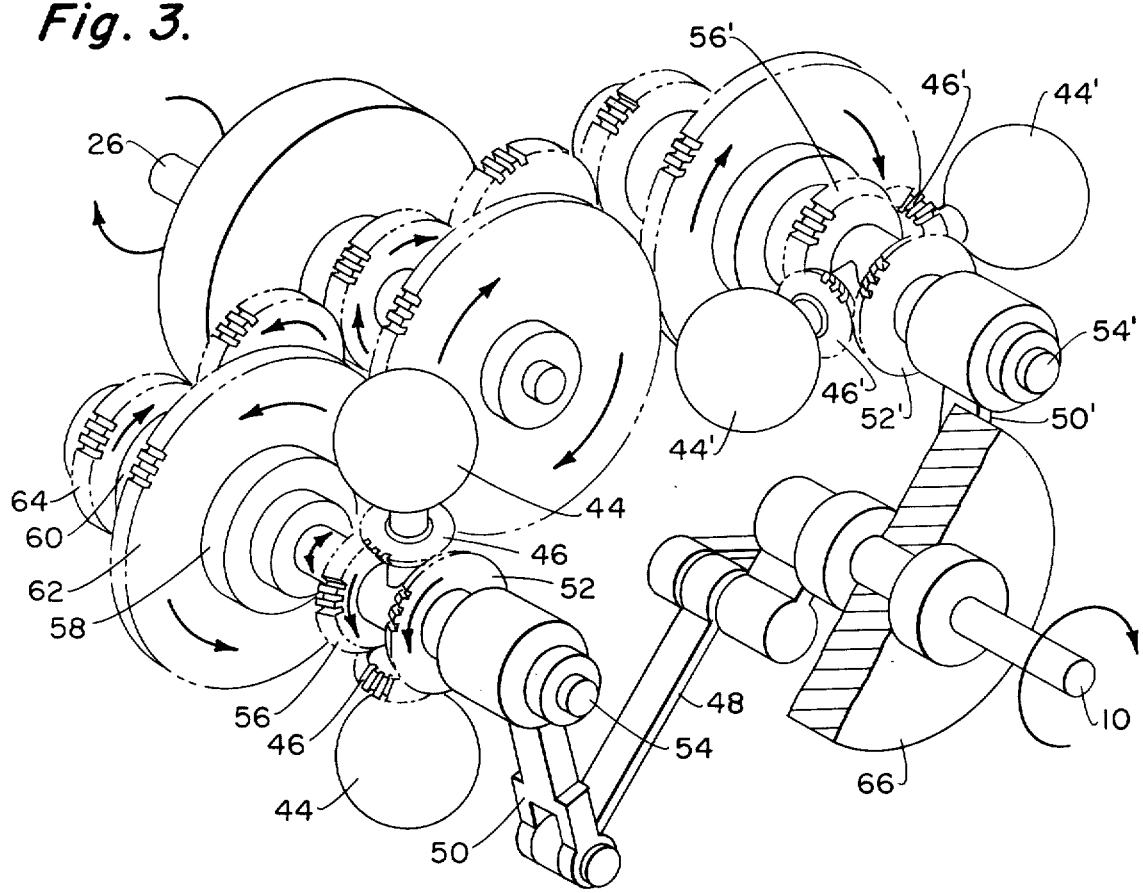
FIG. 3 is a perspective view of another embodiment of the mechanical torque converter.

When shaft 42 is free to rotate, inertia wheel 20 is stationary, i.e., the torque transmitted to inertia wheel 20 through planetary gears 32 is insufficient to overcome the large inertia of inertia wheel 20. However, when shaft 42 is constrained to have zero angular velocity, i.e., no rotation, then the torque exerted on inertia wheel 20, through planetary gears 32, is sufficient to overcome the large inertia of inertia wheel 20. Thus, inertia wheel 20 oscillates as does lever arm 16 when output 26 is stalled. It is noted that when output 26 is heavily loaded but still experiencing an angular velocity, inertia wheel 20 may have sufficient torque imparted thereto to cause it to oscillate. motion of 30 then leads to equivalent prescribed motions for planetary gear 32, output differential gear 34, and inertia wheel 20. Acceleration of 32, 34, and 20 produce inertial reactions (torques) at shaft 40 leading ultimately to output torques as shown in FIG. 3 for the idealized case of no backlash and no friction.

Acceleration $\alpha_{30}$ produces an acceleration $\alpha_{32}$ about axis 40. If 34 and 20 are removed, and there is no friction, then the motion of 32 is given by $$T_{30/32} = I_{32} \alpha_{32} = I_{32} \eta \alpha_{30} \qquad (6)$$

where $T_{30/32}$ is the torque exerted on 32 by 30 and $\eta$ is the ratio $$\eta = N_{30}/N_{32} \qquad (7)$$

The next step in the analysis of the geometry and torques associated with the differential gear mechanism yields the desired relationship $$T_{32/40} = \eta \, T_{30/32} = I_{32} \, \eta^2 \, \alpha_{30} \qquad (8)$$

Next include the dynamics of 34 and 20. For the mechanism of FIG. 1, the acceleration of 34 is $\alpha_{34} = -\alpha_{30}$, so that the motion of 34 and 20 are given by $$T_{20/34} = I_{(34+20)} \alpha_{34} = -I_{(34+20)} \alpha_{30} \qquad (9)$$

The reaction of this torque is applied to 32 and then doubled at 40 to give $$T_{(34+20)/40} = 2I_{(34+20)} \alpha_{30} \qquad (10)$$

The total torque on 40 due to 34, 20 and the two gears (32), from equations 34 and 42, is then $$T_{40} = -2I(1+\beta\eta^2)\theta_{30}' \omega_{10}^2 \sin \theta_{10} \qquad (11)$$

with $\beta$ defined as $$\beta = I_{32}/I \qquad (12)$$

with $I = I_{(34+20)}$, and after using equation 30 for $\alpha_{30}$. The torque $T_{40}$ is transmitted to shaft 42 and then through the clutches and output gears to become the output torque $T_{out}$.

Summing both sides of FIG. 1 (90° out of phase) after passing through gears 22 and 24 to 26 yields finally $$T_{out} = 2I(1 + \beta\eta^2) \theta_{30}'\omega_{10}^2[\sin\theta_{10} + \sin(\theta_{10} + \pi/2)] \quad (13)$$

where the symbol $\sin\theta$ represents the absolute value of $\sin\theta$.

The mean output torque is $$\bar{T}_{out} = \frac{1}{2\pi} \int_0^{2\pi} T_{out}(\theta_{10}) d\theta_{10} \quad (14)$$

After performing the indicated integration and using absolute values, the final equation is $$\bar{T}_{out} = \frac{4}{\pi} I (1 + \beta\eta^2) \theta_{30}'\omega_{10}^2 \quad (15)$$

In most cases, $I_{32} \ll I$, so that a useful approximation that neglects only friction and backlash is $$\bar{T}_{out} = \frac{4}{\pi} I \theta_{30}'\omega_{10}^2 \quad (16)$$

b. NO LOAD. The analysis for the case of zero output load, no backlash, and no friction as given previously was essentially complete. The assumption was made that inertia $I \rightarrow \infty$, i.e., its reaction torque is much greater than loads on the output. This essentially is an assumption that 34 and 20 are fixed and that motion is transmitted through the differential gear mechanism in a conventional manner. The angular velocity of shaft 42 is then given as $$\omega_{42} = 1/2 \, \omega_{30} = 1/2 \, \theta_{30}'\omega_{10} \cos\theta_{10} \quad (17)$$

with maxima at $\cos\theta_{10} = 1$. The angular velocity of the output shaft, with no output, is increased to the maximum value after the first oscillation of either of gear 30. Shaft 26 thereafter rotates (freewheels) at an angular velocity $$\omega_{out} = 1/2 \, \theta_{30}'\omega_{10} = k\omega_{10} \quad (18)$$

c. POWER TRANSMISSION. In the two analyses above for zero power, the kinematics of the differential gear mechanism and the dynamics of the components reduce to their most elementary forms. It will be necessary to develop more general expressions for the kinematics and dynamics of the mechanism before computing transmitted power $P(\theta_1)$ and means power $\bar{P}$.

The kinematics of the differential gear mechanism are defined by $$\omega_{34} = 2\omega_{40} - \omega_{30} \quad (19)$$

$$\alpha_{34} = 2\alpha_{40} - \alpha_{30} \quad (20)$$

where again $\omega_{30}$ and $\alpha_{30}$ are prescribed by equations (3) through (5). The reaction of 34 and 20 on 40 is given by $$T_{(34+20)/40} = -2 I_{(34+20)} \alpha_{34} \quad (21)$$

Combining equations (20) and (21) yields $$T_{(34+20)/40} = 2 I_{(34+20)}(\alpha_{30} - 2\alpha_{40}) \quad (22)$$

which is identical to equation (10) when $\alpha_{40} = 0$.

Next consider the effect of the acceleration of gears 32 about the centerline of 40. The angular velocity of 32 as a function of $\omega_{30}$ and $\omega_{34}$ is $$\omega_{32} = \frac{1}{2} \frac{N_{30}}{N_{32}} (\omega_{30} - \omega_{34}) = \frac{1}{2}\eta (\omega_{30} - \omega_{34}) \quad (23)$$

Combining equations (19) and (23) leads to $$\omega_{32} = \eta(\omega_{30} - \omega_{40}) \quad (24)$$

which after differentiation yields $$\alpha_{32} = \eta(\alpha_{30} - \alpha_{40}) \quad (25)$$

Equation (25) is used in the first part of equation (6) to get $$T_{30/32} = I_{32}\alpha_{32} = I_{32} \eta(\alpha_{30} - \alpha_{40}) \quad (26)$$

which is next used in the first part of equation (8) to get for one gear 32

$$T_{32/40} = I_{32} \eta^2 (\alpha_{30} - \alpha_{40}). \quad (27)$$

The total torque on 40 due to 34, 20 and two gears 32 is $$T_{40} = 2I (\alpha_{30} - 2\alpha_{40}) + 2I_{32} \eta^2 (\alpha_{30} - \alpha_{40}) \quad (28)$$

where again $I = I_{(34+20)}$. Using equation (12) for $\beta$ leads to $$T_{40} = 2I(1 + \beta\eta^2)\alpha_{30} - 2I(2 + \beta\eta^2)\alpha_{40} \quad (29)$$

which reduces to equation (11) if $\alpha_{40} = 0$.

The analysis next examines the response of the mechanism to torque $T_{40}$ ($=T_{42}$). There are two responses, depending on whether $|\omega_{42}|$ is greater than or less than the angular velocity of the load $\omega_L$. If $|\omega_{42}| < \omega_L$, then no torque is transmitted to the load (it is free-wheeling), and the only resistance to $T_{42}$ is due to the inertia of shafts 40 and 42 and the two gears 32, all in rotation about the centerline of shaft 42. Represent this by $I_x$ so that $$I_x = I_{40} + I_{42} + 2I_{32}' \quad (30)$$

With $|\omega_{42}| < \omega_L$ then $$T_{40} = I_x \alpha_x = I_x \alpha_{40} \quad (31)$$

Substitute this into equation (29) to get $$\alpha_{40} = \frac{2I (1 + \beta\eta^2)}{I_x + 2I (2 + \beta\eta^2)} \alpha_{30} \quad (32)$$

This can be simplified by using $$\gamma = I_x/I \quad (33)$$

so that $$\alpha_{40} = \frac{1 + \beta\eta^2}{2 + \beta\eta^2 + \gamma/2} \alpha_{30}. \quad (34)$$

Note that when $\beta$ and $\gamma$ both approach zero, equation (34) reduces to the simpler expression of $\alpha_{40} = 1/2\,\alpha_{30}$. The assumptions of $\beta \rightarrow 0$ and $\gamma \rightarrow 0$ correspond to the assumption of $I \rightarrow \infty$ of the no-load analysis. The assumption of $I \rightarrow \infty$ in that analysis led to $\alpha_{34} = 0$ which is consistent with $\alpha_{40} = 1/2\,\alpha_{30}$. The more general expression of equation (34) merely introduces the dynamics of gears (32) and the inertia of the shaft system $I_s$ when there is no external load. Again neither backlash nor friction are included.

After $\alpha_{40}$ has caused $|\omega_{42}|$ to equal $\omega_L$, assuming that $\omega_L < \omega_{max}$, then power is transferred. In this case $$T_{40} = I_s\alpha_s + T_L \tag{35}$$

where $T_L$ is the torque reaction of the load. If a steady state ($\omega_L$ - const) condition is assumed, equation (35) reduces to $$T_{40} = T_L \tag{36}$$

The remainder of this analysis will assume a steady state condition. Extensions to $\alpha_L \neq 0$ is not difficult but depends on a knowledge of the load and the power source and need not be analyzed here.

Use of equations (36) and (29) with the assumption $\alpha_{40} = 0$ leads to $$T_L = 2I\,(1 + \beta\eta^2)\,\alpha_{30} \tag{37}$$

which occurs during the intervals when $|\omega_{42}| = \omega_L$. Note that equation (37) is identical to equation (11). Power is transmitted during the intervals when $|\omega_{42}| = \omega_L$. Use of equations (37) and (5) yields a quantitative expression for $P(\theta_{10})$ $$P(\theta_{10}) = T_L\omega_L = 2I\,(1+\beta\eta^2)\theta_{30}'\omega_{10}^2\omega_L\,\sin\theta_{10}. \tag{38}$$

Figure 6B:
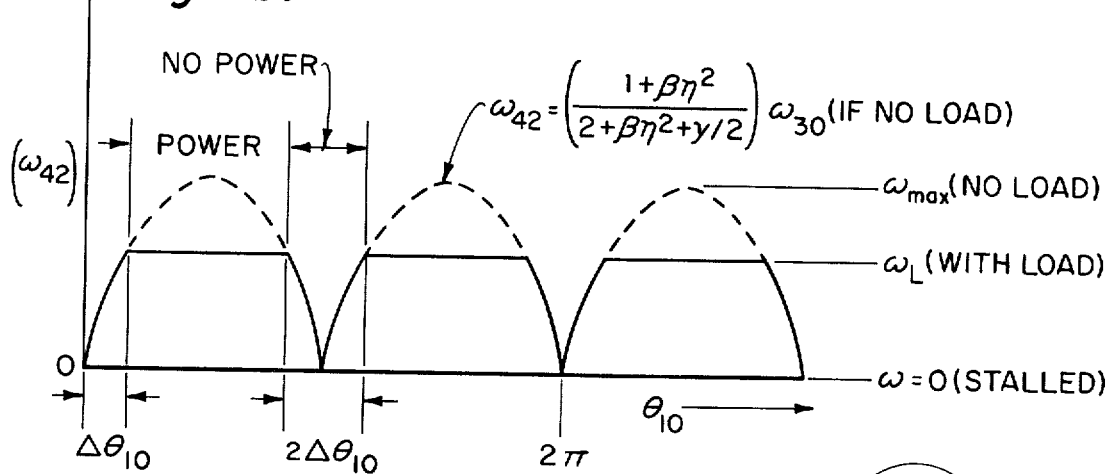
FIG. 6b is a graph illustrating power output.

This can be averaged over an interval $\theta \leq \theta_1 \leq 2\pi$ to get average power for one axis of the FIG. 1 mechanism. Referring to FIG. 6b, an expression for computing mean power is:

$$\bar{P} = \frac{1}{\pi}\,I(1+\beta\eta^2)\theta_{30}'\omega_{10}^2\omega_L \int_{Q}^{2\pi}\sin\theta_{10}\,d\theta_{10}$$

$$- 4\left[\frac{1}{\pi}\,I(1+\beta\eta^2)\theta_{30}'\omega_{10}^2 \int_{0}^{\Delta\theta_{10}} \omega_{42}\sin\theta_{10}\,d\theta_{10}\right] \tag{39}$$

Equation (34) for $\alpha_{40}$ ($= \alpha_{42}$) can be integrated to get an equivalent expression for $\omega_{42}$ of $$\omega_{42} = \frac{1+\beta\eta^2}{2+\beta\eta^2+\gamma/2}\,\omega_{30} + a\text{ constant} \tag{40}$$

The constant will be omitted in this analysis for simplicity. Combining equations (4) and (40) with (39) leads to (after integrating, extracting a common factor, and multiplication by 2 to include both the right and left sides of the FIG. 1 mechanism) the final result of $$\bar{P} = \frac{4}{\pi}\,I(1+\beta\eta^2)\theta_{30}'\omega_{10}^2 \left[\omega_L - \frac{1+\beta\eta^2}{2+\beta\eta^2+\gamma/2}\theta_{30}'\omega_{10}\sin^2\Delta\theta_{10}\right] \tag{41}$$

It is useful to verify that equation (41) reduces to the proper form in the limits of stalled operation and no load operation. Stalled operation has $\omega_L = 0$ and $\Delta\theta_{10} = 0$. This leads to $\bar{P} = 0$ as it should. No load operation implies $\Delta\theta_{10} = \pi/2$ and $\beta \rightarrow 0$ and $\gamma \rightarrow 0$ as discussed earlier. In this case, equation (41) becomes $$\bar{P} = \frac{4}{\pi}\,I\theta_{30}'\omega_{10}^2 \left[\omega_L - \tfrac{1}{2}\theta_{30}'\omega_{10}\right] \tag{42}$$

Reference to equation (18) shows that $\omega_{max} = 1/2\theta_{30}'\omega_{10}$, so that when $\omega_L = \omega_{max}$, equation (42) vanishes. The condition $\omega_L > \omega_{max}$ is not relevant because the load is then free-wheeling. Note also that the coefficient of the bracketed term in equation (41) is identical to equation (15) for $T_{out}$ of the stalled case.

The conclusion is that torque out remains constant (except for the fluctuations in FIG. 3) for a given $\omega_{10}$ over the entire range of output loads from stalled operation up to (but not including) the condition of freewheeling. The magnitude of the torque is proportional to $I\theta_{30}'\omega_{10}^2$. Average power-out changes for a given $\omega_{10}$, not by variations in $T_L$, but by changes in $\omega_L$ and the length of the intervals $\Delta\theta_{10}$.

For any specific mechanism, a definite relationship $\Delta\theta_{10} = f(\omega_L)$ exists, although it may be so complex that a numerical solution is preferable for actual quantitative results. This would certainly be true if the characteristics of the power source and the load (along with friction and backlash) were included.

Figure 5:
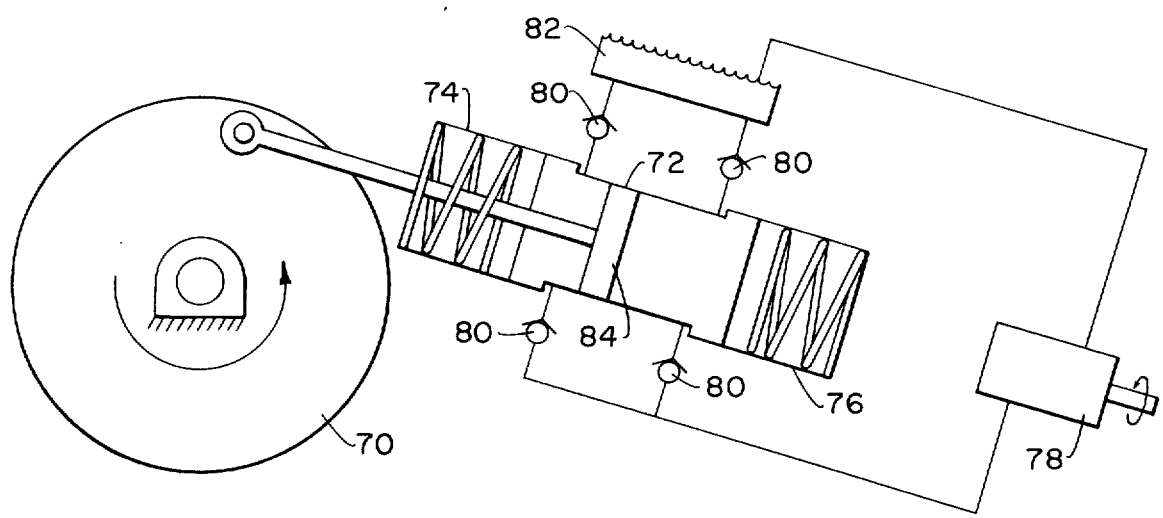
FIG. 5 is a somewhat schematic view of a mechanical torque converter utilizing hydraulics as the energy storing device.
Figure 4:
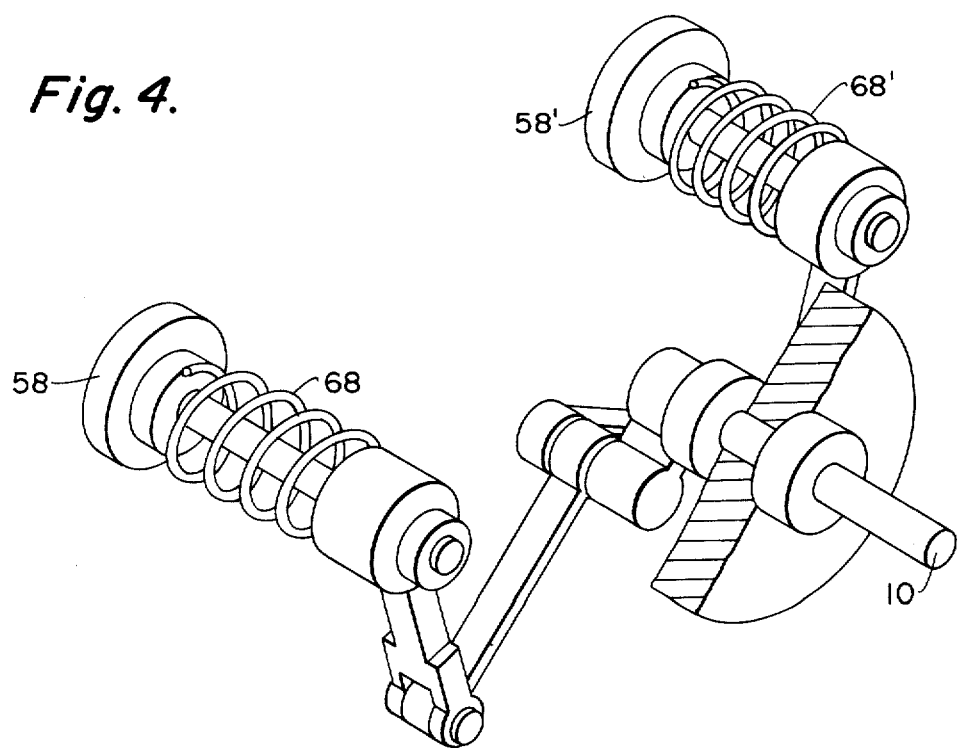
FIG. 4 is a partial view of a mechanical torque converter utilizing springs as the energy storing devices.

FIGS. 3, 4 and 5 illustrate alternate designs that employ the same dynamical processes used in the design discussed above. FIG. 3 shows a mechanical torque converter nearly identical with that of FIG. 1 which operates on the same principle, except that inertia masses 44 were adopted for the energy storage and conversion. As in the preferred embodiment, this device employs a multi-degree-of-freedom gear and linkage system with overrunning clutches. For clarity, only one inertia power flow will be discussed, bearing in mind that the inertia systems work identically and their combined function is as discussed in conjunction with the preferred embodiment above. Again, the crank shaft 10 is the input, and the two spheres 44 attached to differential spider gears 46 are the inertia. Rotation of crank shaft 10 operates connecting rod 48 and crank rocker arm 50 to produce oscillatory motion of bevel gear 52. Shaft 54 is attached to bevel gear 56 and passes through and supports bevel gear 52 and inertia masses 44. That is, the inertia system comprised of inertia masses 44 and spider gears 46 rotate freely with bevel gear 52 on shaft 54.

In operation, the two spheres 44 serve the same function as the inertia flywheel 20 (FIG. 1) of the preferred embodiment, absorbing and discharging energy. Whether the inertia masses 44 are accelerating or decelerating, torque is applied to the output through overrunning clutches 58 and 60 and gears 62 and 64, which in effect operate as mechanical rectifiers in the same manner as discussed with the embodiment of FIG. 1. When shaft 52 turns counter-clockwise (i.e., bevel gear 52), the overrunning clutch 60, attached to the small gear 64, is engaged and the overrunning clutch 58 on shaft 54 (attached to the larger gear 62) slips. The opposite occurs when shaft 54 turns clockwise. As a result, when torque is applied to gear 52, regardless of direction, a clockwise torque results on the output shaft 26, as discussed previously. The magnitude of inertia torque applied to the output depends on the linkage position and angular velocities of the input and output.

With output shaft 26 fixed (no rotation), the inertia masses 44 oscillate at the frequency of the input and with a relatively large angular displacement. Each complete angular oscillation of the two spheres 44 represents one cycle, with acceleration or increase in absolute angular velocity of the masses absorbing energy, and deceleration or decrease in absolute angular velocity returning energy to the input flywheel 66. During the cycle, a pulsating torque is applied to the output shaft 26 from the reaction of the inertia masses 44.

At the other extreme (i.e., with output shaft 26 freely rotating with little or no load or output torque), little oscillation of inertia masses 44 occurs and the differential acts much as a simple gear train. That is, inertia spheres 44 remain practically motionless and rotation of gear 52 transmits a corresponding rotation to bevel gear 56 through spider gears 46. Thus, the input angular motion is transferred directly to the output with a change in direction produced from the crank rocker 50 being rectified by the overrunning clutches 58 and 60. Maximum velocity exists on the output shaft 26 with the speed ratio at function of the linkage dimension and gear ratios. As discussed in detail above, a combination of both modes exists when conditions in the mechanical torque converter are between these two extremes.

The two mechanical torque converters of FIG. 1 and FIG. 3, described above, use an inertia mass to absorb the energy input as kinetic energy and reconvert it into mechanical energy on the output; however, kinetic energy is only one form of passive energy. There are many other forms also capable of storing and transmitting torque. Some of these other forms of energy would also work in this device, but its characteristic properties would be different from the kinetic energy systems described above. For example, if a spring 68 were used instead of the inertia masses, as shown in FIG. 4, the new device would still work as a torque converter; however, it would require a larger starting torque because the spring's energy is a function of the spring constant (lbs. per in.) and displacement. FIG. 4 only illustrates the input portion of the mechanical torque converter up to the first overrunning clutch 58 because the rectification system and output are identical with that previously discussed. As a result, the input angular velocity would not alter the maximum output torque and the input torque would have to be large enough to fully compress the spring 68 on the first cycle. The output power would, however, be a function of the input angular velocity because of the energy rate.

A hydraulic system could also be used as illustrated in FIG. 5. This system would have theoretical characteristics essentially identical to the mechanical spring system. The system is comprised of an input flywheel 70, a double-acting ram 72, spring accumulators 74, 76, and hydraulic motor 78. Rectification is accomplished with check valves 80 controlling the flow of hydraulic fluid from reservoir 82 to hydraulic motor 78.

If the hydraulic system has been at rest for some time, the spring accumulators 74 and 76 will adopt their minimum energy (extended) position due to leakage through the motor 78. Assume first that the hydraulic motor 78 is initially stalled. After the first full cycle of the piston 84 of the double-acting ram 72, the accumulators 74 and 76 will alternately become fully charged. With successive cycles of the piston 84, the hydraulic fluid from one accumulator (and its energy) will merely be exchanged to the other accumulator.

In this mode, the oscillating motion of the piston can be continuous (similar to the input angular velocity ($\omega$) described with respect to the first embodiment) with zero input torque (for a perfect fluid and system). The output angular velocity of the hydraulic motor ($\Omega$) is zero and the torque is finite (maximum). As with the torque converter of FIG. 1, power-in and power-out approximately equal zero in the stalled output mode.

If the hydraulic motor 78 is permitted to turn, fluid will flow in the external circuit. This fluid will be replaced in the double-acting ram cylinder 72 by the motion of the piston 84. Note that an accumulator will "bottom out" in the extended position before the piston has reached its opposite limit only if fluid has been withdrawn by the external circuit (i.e., check valves 80 and hydraulic motor 78). This amount of fluid is replaced as the piston continues to its limit. When the fluid being withdrawn equals in quantity the flow capacity of the oscillating piston 84, the device has approached its other limiting conditions of output torque T approaching zero and output angular velocity ($\Omega$) being at a maximum. Again, power-in and power-out approximately equal zero.

In conclusion, all the systems described above use the same three basic components having common dynamic features of the mechanism of FIG. 1 (i.e., oscillator, energy storage and transfer device, and rectifier). The generation of oscillatory motion in the mechanical embodiments is by a system composed of a crank rocker, which converters the angular motion into alternating angular displacements; however, non-circular gears could be used. The oscillator drives energy storing devices such as inertia masses, springs or hydraulics, which transfer the energy "back and forth" when output energy is needed while maintaining a generalized force (torque, pressure, etc.) at the output. The transferred energy is then rectified to produce a useful (unidirectional) motion.

It should be noted also that operation of the mechanism of FIG. 1 is not affected if a net rotation is imposed on the oscillatory motion of rocker arm 16 and differential system 18. It is the angular acceleration of the inertia wheels 20 that provide the inertial reaction at shaft 40, not their angular velocity. Thus, any mechanism that achieves this is appropriate, such as, for example, non-circular gears mentioned above.

The level of torque with the kinetic energy system is derived from the acceleration of the inertia wheels 20. The acceleration produced from the crank-rocker 16 is derived from the angular acceleration caused by the changing angular displacements. Angular acceleration using the same principle can also be produced from a changing angular velocity. The principles involved are identical and, other than the oscillator, no change in design is needed because of the multi-degree-of-freedom in the differentials 18. Consequently, non-circular gears (e.g., elliptical) could be used in place of the crank-rocker, as shown in FIG. 7.

Figure 7:
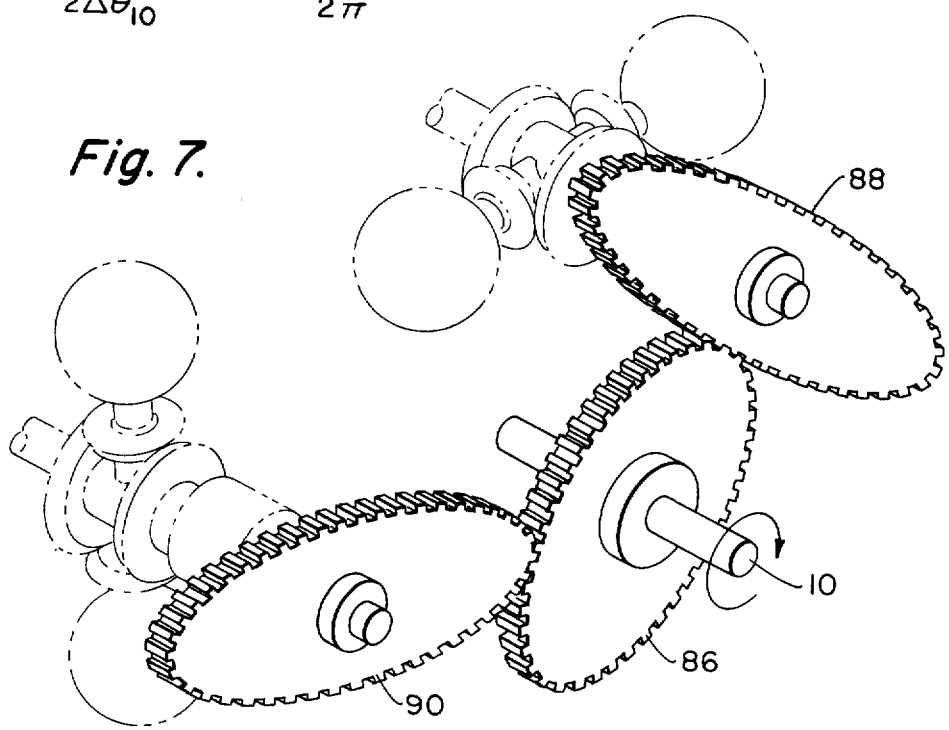
FIG. 7 is a partial view of a non-circular gear embodiment.

In the embodiment of FIG. 7, velocity oscillations are produced by non-circular gear 86, attached to shaft 10, driving non-circular gears 88 and 90, which are 90° out of phase. The output torque is produced from the inertial acceleration derived from the time varying inertia velocity the same as the crank-rocker design. The principles involved are identical including the torque phasing. In fact, the design may be identical to the crank-rocker embodiments of FIGS. 2 and 4, except for the oscillator because of the multi-degree-of-freedom in the differential. Actually, the non-circular gears should be superior because no balancing is required and the gear movement is continuous, insuring good lubrication.

Also, more than two axes could be used; for example, a three-axes system would achieve the equivalent of three-phase operation. Summation of the rectified outputs would yield a "smoother" output. Obviously the concept could be extended either by adding additional inertia devices or by using more than one oscillation per net rotation of the input. The complexity of such extensions might soon, however, outweigh the net gain in results. This is especially true in view of the fact that the output torque is also proportional to $\theta$, the magnitude of the oscillation of the inertia wheel 20. The kinetic energy system of FIG. 1 is preferred because little starting torque is required to initiate angular movement on the input. Another important property of the kinetic mechanism is that it stores and transmits the energy independent of its own position. Inertia system depends solely on acceleration/deceleration and not position, which, through the use of a differential 18, has the unique characteristic of offering virtually the same inertia resistance for all positions.

Obviously many modifications and variations of the present invention are possible in light of the above teachings. It is therefore to be understood that within the scope of the appended claims the invention may be practiced otherwise than as specifically described.

I claim:

1. A torque converter for transmitting power comprising:
   a. means for applying input power to said torque converter;
   b. means for generating oscillatory motion from said input power;
   c. rectifying means coupled to said oscillatory motion generating means for rectifying the oscillatory motion coupled thereto;
   d. output means;
   e. means connected between said output means and said rectifying means for driving said output means such that said output means experiences unidirectional rotational motion; and
   f. energy storage means coupled to said oscillatory motion generating means for storing such integrated amounts of said generated oscillatory power in the form of energy as is not transmitted to said rectifying means and dissipated at said output means, said generated oscillatory power absorption being divided in variable amounts between storage in the form of energy by said energy storage means and dissipation by said output means.

2. The torque converter of claim 1 wherein said torque converter further includes differential means for coupling both said rectifying means and said energy storage means to said oscillatory motion generating means.

3. The torque converter of claim 2 wherein said oscillatory motion generating means includes at least two oscillating members having a predetermined phase relationship therebetween.

4. The torque converter of claim 2 wherein said predetermined phase relationship for two energy storage devices includes a ninety degree phase difference between each said oscillating member.

5. The torque converter of claim 3 wherein:
   a. said rectifying means includes at least two rectifiers respectively coupled to said oscillating members; and
   b. said energy storage means includes at least two energy storage devices respectively coupled to said oscillating members.

6. The torque converter of claim 5 wherein said differential means includes at least two differentials for coupling said rectifiers and said energy storage devices to said respective oscillating members.

7. The torque converter of claim 5 wherein each said rectifiers includes a pair of oppositely acting overrunning clutches.

8. The torque converter of claim 7 wherein said driving means includes a gear train operated by each said overrunning clutch.

9. The torque converter of claim 8 wherein said gear train includes non-circular gears.

10. The torque converter of claim 9 wherein said non-circular gears include elliptical gears.

11. The torque converter of claim 9 wherein each said energy storage device includes an inertia device.

12. The torque converter of claim 11 wherein said inertia device includes an inertia wheel.

13. The torque converter of claim 11 wherein said inertia device includes a pair of inertia masses.

14. The torque converter of claim 5 wherein each said energy storage device includes a spring.

15. The torque converter of claim 1 wherein said means for generating oscillatory motion includes:
   a. a crank-rocker arm; and
   b. at least two lever arms connected to said crank-rocker arm.

16. The torque converter of claim 1 wherein said torque converter further includes hydraulic means for coupling both said rectifying means and said energy storage means to said oscillatory motion generating means.

17. The torque converter of claim 16 wherein said oscillatory motion generating means includes a double-acting hydraulic device.

18. The torque converter of claim 16 wherein said energy storage means includes at least two hydraulic accumulators hydraulically communicating with said hydraulic ram.

19. The torque converter of claim 18 wherein said rectifying means includes hydraulic check valves associated with each end of said double-acting ram and said accumulators.

20. The torque converter of claim 19 wherein said driving means includes a hydraulic motor hydraulically communicating with said hydraulic check valves.

21. A method of transmitting power by converting torque comprising:
   a. applying input power to a shaft;
   b. generating oscillatory motion from said input power;
   c. transmitting said oscillatory motion to a rectifier and to at least two energy storage devices, said input power absorption being divided in variable amounts between storage in the form of energy by said energy storage devices and dissipation through said rectifier;

d. rectifying said oscillatory motion transmitted to said rectifier;

e. driving an output shaft to unidirectionally rotate about its longitudinal axis with the power from said rectified oscillatory motion; and f. oscillating said energy storage devices with said oscillatory motion transmitted thereto, said oscillating energy storage devices having a predetermined phase relationship therebetween.

22. The method of claim 21 wherein the step of oscillating said energy storage devices includes oscillating two said energy storage devices ninety degrees out of phase.

23. The method of claim 21 wherein the step of rectifying includes oscillating a pair of oppositely acting overrunning clutches associated with each energy storage device.

24. The method of claim 21 wherein the step of transmitting includes driving at least two differentials with said oscillatory motion, each said differential being coupled to said rectifier and to a respective energy storage device.

* * * * *